United States Patent [19]

Ghisler

[11] Patent Number: 5,541,976
[45] Date of Patent: Jul. 30, 1996

[54] COMMUNICATIONS SYSTEM FOR INTEGRATING A PAGING SYSTEM WITH CELLULAR RADIO TELEPHONES

[75] Inventor: Walter Ghisler, Upplands Vasby, Sweden

[73] Assignee: Telefonaktiebolaget LM Ericsson, Stockholm, Sweden

[21] Appl. No.: 476,041

[22] Filed: Jun. 7, 1995

Related U.S. Application Data

[63] Continuation of Ser. No. 159,116, Nov. 30, 1993, abandoned, which is a continuation of Ser. No. 686,600, Apr. 17, 1991, abandoned.

[51] Int. Cl.⁶ .................................................. H04Q 7/22
[52] U.S. Cl. .............................. 379/57; 379/59; 455/343
[58] Field of Search ................................. 379/57, 58, 59; 455/38.3, 127, 343, 33.1

[56] References Cited

U.S. PATENT DOCUMENTS

| | | |
|---|---|---|
| H610 | 3/1989 | Focarile et al. . |
| 3,564,150 | 2/1971 | Muller . |
| 3,575,558 | 4/1971 | Leyburn . |
| 3,581,013 | 4/1971 | Muller . |
| 4,399,555 | 8/1983 | MacDonald et al. . |
| 4,642,425 | 2/1987 | Guinn, Jr. et al. ......................... 379/57 |
| 4,747,122 | 5/1988 | Bhagat et al. . |
| 4,748,655 | 5/1988 | Thrower et al. . |
| 4,850,006 | 7/1989 | Sasaki et al. . |
| 4,873,711 | 10/1989 | Roberts et al. . |
| 4,906,989 | 3/1990 | Kasugai ............................. 455/11.1 X |
| 5,020,090 | 5/1991 | Morris ....................................... 379/58 |
| 5,040,204 | 8/1991 | Sasaki et al. ......................... 379/57 X |
| 5,054,052 | 10/1991 | Nonami ..................................... 379/57 |
| 5,065,423 | 11/1991 | Gaskill ..................................... 379/57 |
| 5,097,500 | 3/1992 | Itoh ............................................ 379/62 |

FOREIGN PATENT DOCUMENTS

| | | |
|---|---|---|
| 0140351 | 5/1985 | European Pat. Off. . |
| 63-224422 | 9/1988 | Japan ....................................... 379/57 |
| 2201866 | 9/1988 | United Kingdom . |

*Primary Examiner*—Curtis Kuntz
*Assistant Examiner*—G. J. Oehling
*Attorney, Agent, or Firm*—Burns, Doane, Swecker & Mathis, L.L.P.

[57] ABSTRACT

The present invention relates to a cellular mobile radio telephone system which incorporates an independent paging capability with an existing mobile telephone by taking advantage of call forwarding and redirecting features available on the telephone switching network. When a mobile telephone is set to an active or "on" mode, calls are directed to that mobile telephone using the cellular paging channel and conventional cellular paging procedures. However, when the mobile telephone is set to a sleep mode and the power is switched off, the mobile switching center automatically forwards calls to the mobile to an independent paging system which transmits the call as a paging signal to a small pager associated with the mobile telephone. When the pager receives a page signal as a result of the forwarded call, the pager transmits a low-power signal to the mobile telephone which switches on the power of the mobile telephone. A predetermined time after forwarding the call to the paging system, the mobile switching center redirects the forwarded calls using redirecting procedures to the mobile telephone. By the time the call is redirected, the mobile station has been activated and can now receive the call directly. Because the active pager consumes much less power than the mobile telephone listening to a paging channel of the cellular system, setting the mobile telephone to the sleep mode results in considerably less battery drain. When the mobile is set to a page mode, the pager functions as a conventional paging device.

3 Claims, 5 Drawing Sheets

Fig. 5
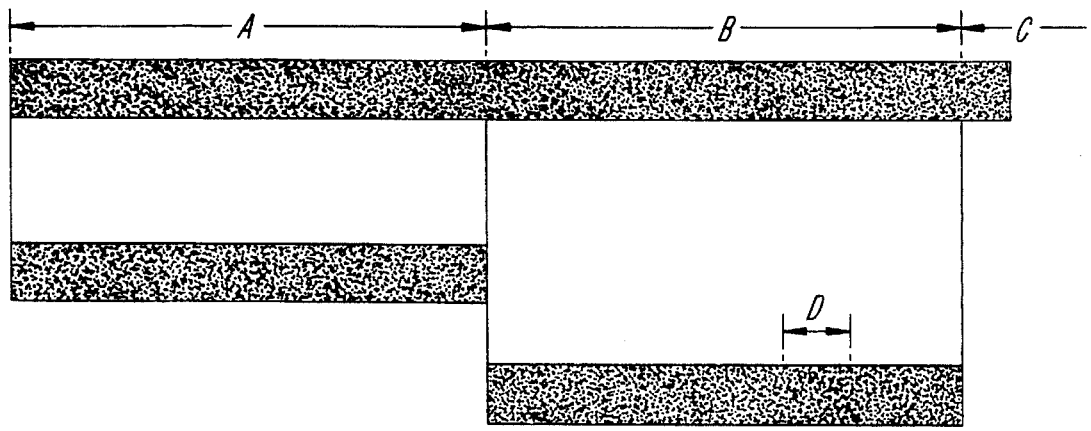
A : PREAMBLE. DURATION AT LEAST 576 BITS = THE DURATION 1 BATCH + 1 CODEWORD
B : FIRST BATCH
C : SECOND AND SUBSEQUENT BATCHES      SC : SYNCHRONIZATION CODEWORD
D : ONE FRAME = 2 CODEWORDS
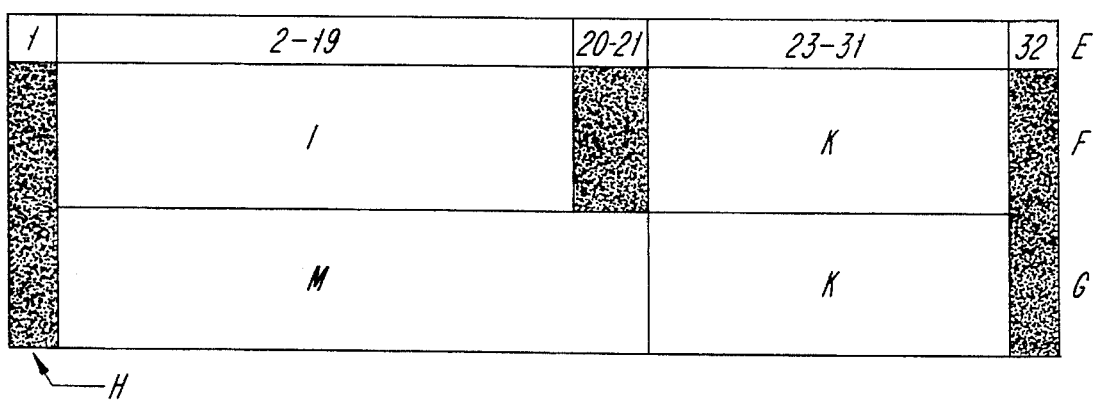
E : BIT NUMBER
F : ADDRESS CODEWORD
G : MESSAGE CODEWORD
H : FLAG BIT
I : ADDRESS BITS (2-19)
J : FUNCTION BITS
K : CHECK BITS
L : EVEN PARITY BIT
M : MESSAGE BITS (2-21)

5,541,976

COMMUNICATIONS SYSTEM FOR INTEGRATING A PAGING SYSTEM WITH CELLULAR RADIO TELEPHONES

This application is a continuation of application No. 08/159,116, filed Nov. 30, 1993 which was a continuation of application No. 07/686,600, filed Apr. 17, 1991 (both now abandoned).

FIELD OF THE INVENTION

The present invention is directed to cellular telephone and paging systems. More particularly, the present invention is directed to a mobile cellular telephone that incorporates independent paging capabilities.

BACKGROUND OF THE INVENTION

Radio paging systems and mobile radio telephone systems are well known and widely used. Upon receipt of a page, radio paging systems provide a user with audio and/or visual information from the paging party, but cannot transmit information back to the paging party. Recently, national and international paging services have been implemented so that individuals may receive a page throughout the United States or throughout Europe. Despite the advances in paging technology, a significant disadvantage of radio paging is that after an individual carrying a pager has learned that a paging party wishes to communicate, that individual must locate a telephone communication system to contact the paging party.

Radio paging systems typically include a radio transmitter for transmitting a coded, radio frequency signal associated with a party to be paged and a portable paging receiver. To contact a party carrying a pager, a person dials a telephone number. The number is transferred by the Public Switching Telephone Network (PSTN) to the radio transmitter. The transmitter transmits a page signal coded to all pagers in the range of the transmitter. Because each mobile pager responds to a different paging signal, only the pager having a code corresponding to that transmitted is activated. The activated pager generates an audible tone or some other signal to notify the designated party that he or she has been paged. That party typically responds by calling a specific telephone number to receive further instructions.

One advantage of paging systems is that they can serve relatively large geographic areas. Another advantage is that a paging subscriber may be reached anywhere in the transmitter coverage area without knowing the location of that subscriber. As described above, the major disadvantage of paging systems is that a subscriber cannot immediately communicate with the persons who initiated the call. In fact, the subscriber cannot even acknowledge that he has received the page.

In contrast, mobile radio telephone systems allow flexible, two-way radio communications with a plurality of mobile subscribers. Cellular telephones allow subscribers to be paged immediately over cellular paging frequencies (as long as the phone unit is "on") via the wired telephone network. The mobile telephone responds immediately to a page in order to capture a voice channel for the communication. In addition, subscribers may initiate calls themselves. Unfortunately, mobile telephones cannot be paged while the mobile telephone is "off" or deactivated. To keep the mobile telephone activated continuously in order to monitor a cellular paging channel imposes a significant drain on the mobile telephone battery. As a result, large, bulky batteries are required.

Although mobile telephones have a greater number and variety of functions as compared to pagers, with respect to the paging function, pagers require less battery power. Attempts have been made to reduce the size and the weight of mobile telephone batteries, in particular, the batteries of hand held mobile telephones. Specialized techniques have been developed in conjunction with these reduced batteries. One method is discontinuous transmission (DTX) where the sender draws current only when speech is actually transmitted. Another method is discontinuous reception (DTR) where paging occurs at predetermined intervals known to the mobile and the land system with the mobile receiver being turned off during inactive periods. Nonetheless, battery size and weight in hand held mobile telephones are still a considerable problem.

In the near future, dual mode mobile telephones will be introduced into the U.S.A. according to the EIA/TIA Standard IS-54 which are capable of communicating over both analog and digital voice channels but use analog control channels. While the next generation of mobile telephones will include purely digital mobiles communicating over digital voice channels only and using only digital control channels, most of these digital mobiles will be hand held telephones and will be used in the cities. It is likely that the mobile telephone base stations in rural areas will remain analog for quite some time. In that situation, the radio coverage for digital mobile stations will be less than it is for pagers. Thus, it is desirable to take advantage of both cellular and traditional paging services.

One disadvantage with cellular telephony is that a subscriber's location must be known to the cellular system. Subscriber location is achieved by registering each mobile periodically. In contrast, paging systems do not require individual pagers to register. Thus, paging services are advantageous in situations where a subscriber desires to keep his exact location secret but still wants to have the option of being contacted.

Recently, it has become possible to subscribe to a cellular service and to an independent paging system. Telephone calls from the land-based telephone network are attempted initially with the mobile station over the cellular network. If the subscriber does not answer, the call is diverted to a FM radio paging system.

A cellular pager is disclosed in U.S. Statutory Invention Registration H610 to Focarile et al. In this system, a separate paging system is used in conjunction with the cellular telephone system. The paging system provides a backup for cellular telephone calls intended for an associated cellular telephone which has been deactivated because the subscriber is, for example, temporarily away from his automobile. Assigned the same number as the associated cellular telephone, the pager provides an alert signal to the subscriber of the cellular telephone indicating that a caller is trying to reach the telephone's assigned number. Later, the subscriber may call an appropriate service number for the information when the subscriber returns to the automobile and activates the cellular telephone.

Another system combining paging capabilities with a cellular system is disclosed in U.S. Pat. No. 4,748,655 to Thrower et al. In addition to conventional cellular components, the Thrower patent incorporates a pocket-sized, radio telephone for short range, low-powered communication with the cellular system over various "gateway" devices, e.g., a mobile radio telephone set. These pocket-sized phones are similar to cordless telephones which communicate with the gateway devices using low-power transmitter/receiver units. The portable telephone transmits its identification number to the gateway device which transmits the portable telephone's identification number and location via the base station to the mobile switching center of the cellular network. When the subscriber is out of range of a gateway device or does not have a gateway device, his portable telephone can operate as a paging device from a separate paging station. However, because of the portable telephone's low power, the subscriber is unable to communicate back with the paging station.

The prior art attempts to integrate paging and cellular communications systems are not always convenient to the subscriber and efficient in terms of battery consumption. Focarile's system requires a subscriber to carry an activated paging device around as well as an activated mobile telephone. This situation is burdensome and wastes considerable battery power. Moreover, if only the paging device is activated, the subscriber can only be reached by dialing his page number. Once paged, the subscriber must activate his mobile telephone, dial a message center, retrieve the message/number, and call back the paging party. Similarly, a major drawback of the Thrower system is that it requires, in addition to standard cellular components, cumbersome, portable phone and gateway circuitry which are energy inefficient and relatively expensive.

SUMMARY OF THE INVENTION

The present invention relates to a cellular mobile radio telephone system which incorporates an independent paging capability with an existing mobile telephone by taking advantage of call forwarding features available on the telephone switching network. When a mobile telephone is set to an active or "on" mode, calls are directed to that mobile telephone using the cellular paging channel and conventional cellular paging procedures. However, when the mobile telephone is set to a sleep mode and the power is switched off, the mobile switching center automatically forwards calls to the mobile to an independent paging system which transmits the call as a paging signal to a small pager associated with the mobile telephone. When the pager receives a page signal as a result of the forwarded call, the pager transmits a low-power signal to the mobile telephone which switches on the power of the mobile telephone. A predetermined time after forwarding the call to the paging system, the mobile switching center redirects the forwarded calls to the mobile telephone. By the time the call is redirected, the mobile station has been activated and can now receive the call directly. Because the active pager consumes much less power than the mobile telephone listening to a paging channel of the cellular system, setting the mobile telephone to the sleep mode results in considerably less battery drain. When the mobile is set to a page mode, the pager functions as a conventional paging device. The pager and mobile are separate physical units and may communicate using low power, radio transmission or acoustical signals.

BRIEF DESCRIPTION OF THE DRAWINGS

The present invention will now be described in more detail with reference to preferred embodiments of the invention, given only by way of example, and illustrated in the accompanying drawings, and in which:

FIG. 5 illustrates the signaling format of paging signals broadcast by the paging system according to the present invention.

DETAILED DESCRIPTION OF THE PREFERRED EMBODIMENTS

Figure 1:
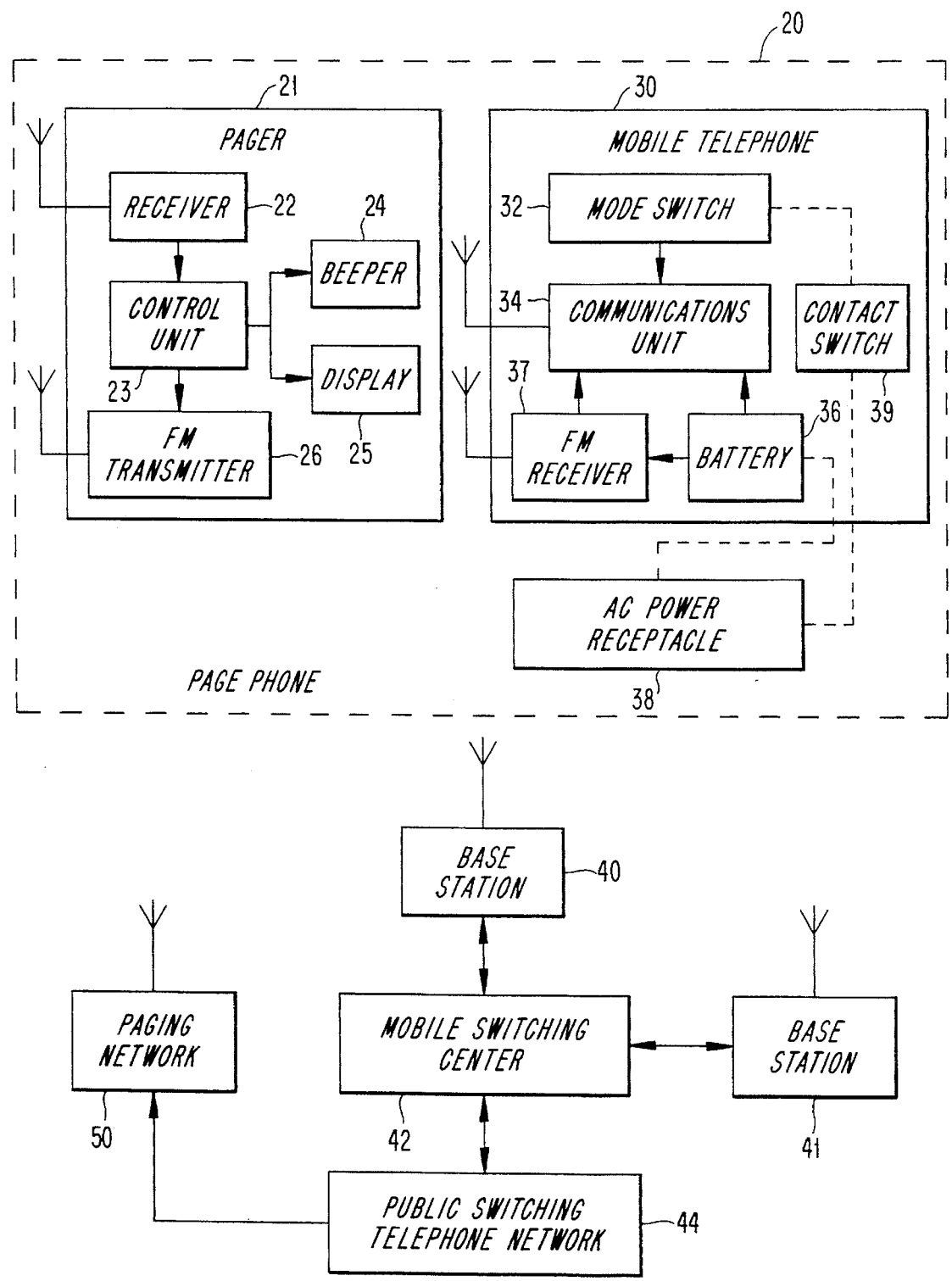
FIG. 1 shows a functional block diagram of a page phone and associated land system according to the present invention.

Referring now to FIG. 1 the overall system operation of a cellular page phone 20 will be described. The page phone 20 consists of two elements: a pager 21 and a mobile telephone 30. In general, the pager 21 includes a radio frequency receiver 22, preferably an FM receiver, for receiving page communications transmitted by a conventional, independent paging network 50. The pager 21 also includes a control unit 23, a beeper 24, a display 25, and a conventional, low-power FM transmitter 26. The mobile telephone 30 includes a communications unit 34, described in more detail in conjunction with FIG. 3, which houses the communications circuitry found in standard mobile telephones. A mode switch 32 is used to switch the mobile telephone into one of four distinct modes: an on mode, a sleep mode, a page mode, and an off mode. The communications unit 34 is powered by a battery unit 36.

The page phone includes an AC power receptacle 38 which recharges the battery 36 and provides power to the mobile telephone 30 when the telephone is placed in the receptacle. As such, the telephone 30 may be operated in the "on" mode without a drain to the battery 36. The receptacle 38 may be located, for example, in the subscriber's automobile or at the subscriber's desk. When the subscriber moves away from his automobile or his desk and removes the telephone 30 from the power receptacle 38, that removal is detected by a contact switch 39 located on the surface of the telephone 30 that interfaces with the power receptacle 38. In that situation, the contact switch causes the mode switch to change from the "on" mode to the "sleep" mode in order to conserve the battery 36.

Calls initiated from the land-based system may be directed through a public switching telephone network (PSTN) 44 to a mobile switching center (MSC) 42 and finally through a base station 40 associated with the page phone 20. Alternatively, calls which have been initiated by other mobile telephones may be communicated to the page phone 20 from a corresponding base station 41 through the mobile switching center 42 and the base station 40.

The pager 21 and the mobile telephone 30 is separated into two distinct mechanical packages. In the preferred embodiment, the pager 21 is physically separated from the mobile telephone 30 and is housed in a wristwatch worn by the subscriber. Since the pager 21 is separately housed, it must also be provided with a small battery (not shown) suitable for powering the wristwatch as well as the paging circuitry. Although the subsequent description pertains to the pager 21 communicating with the mobile telephone via FM radio signals, it will be recognized by those skilled in the art that the pager 21 and mobile telephone 30 may communicate using acoustical signals or hardwired connections as well.

When a user selects the ON mode using the mode switch 32, the mobile telephone 30 operates in a conventional manner within the cellular system. A call to the mobile telephone 30 from the base station 40 will be initiated as a page over the cellular control channel assigned to the base station 40. Each mobile telephone is identified by a number of digits referred to as the mobile identification number. In the ON mode, the mobile telephone 30 actively monitors the control channel assigned to the base station 40 for page signals containing its identification number. Once the mobile telephone 30 detects a page having its identification number, a voice channel is obtained so that the intended communication can take place. If the subscriber does not answer, the mobile switching center 42 may store the calling subscriber's number, usually referred to as the A-number, for subsequent retrieval by the subscriber. A major disadvantage of this type of cellular system is that even though the mobile telephone 30 is only monitoring the control channel and no conversation is taking place, it drains the battery 36.

In the sleep mode, the mobile telephone 30 is deactivated except for the FM receiver 37 and the pager 21 is activated. Just before the mobile telephone 30 is deactivated, it sends a deactivation message to the mobile switching center 42. The mobile switching center 42 registers this fact and establishes a call forwarding procedure for calls placed to the mobile telephone 30. Call forwarding is a well known feature available on most, if not all, telephone networks. Thus, whenever a caller dials the telephone number of a mobile telephone in the sleep mode, the MSC 42 directs the call through the PSTN 44 to the independent paging network 50. When the paging network 50 receives the forwarded call, it transmits a paging signal to the pager 21 over the conventionally assigned paging frequencies. Wide area paging systems use telephone numbers to identify a paging subscriber. Paging subscribers may be treated exactly like any other telephone subscribers. Dialing the telephone number assigned to the paging subscriber results in paging of that subscriber. The details of how the Page redirection process is performed in the telephone network is known to those skilled in the art and therefore will not be described here. In general, however, the telephone number of the mobile station is translated in the MSC 42 to the telephone number identifying the pager, and this new number is used for forwarding the call to the paging system. The receiver 22 of the pager 21 detects its paging identification number. The paging control unit 23 generates a FM radio signal via the low power, FM transmitter 26. The frequencies over which the FM signal is transmitted are different from cellular or paging frequencies. Such frequencies may be, for example, in the frequency band assigned to amateur radio enthusiasts. Finally, the FM signal is received by the FM receiver 37 which activates the power to the mobile telephone 30.

It may be necessary to distinguish the low power, FM radio signal between one pager and its associated mobile telephone from a signal corresponding to another pager/mobile pair, in order to prevent activation of another, nearby mobile telephone. This distinction is achieved substantially, for example, by assigning to different subscribers different frequencies or different pairs of frequencies modulating an FM carrier out of a number of predefined frequencies. Only in rare situations will there be an occasional error in activating a neighbor mobile station. Nonetheless, the drain on that neighboring mobile's battery occurs for only a short time because no neighboring call will be received.

Figure 2:
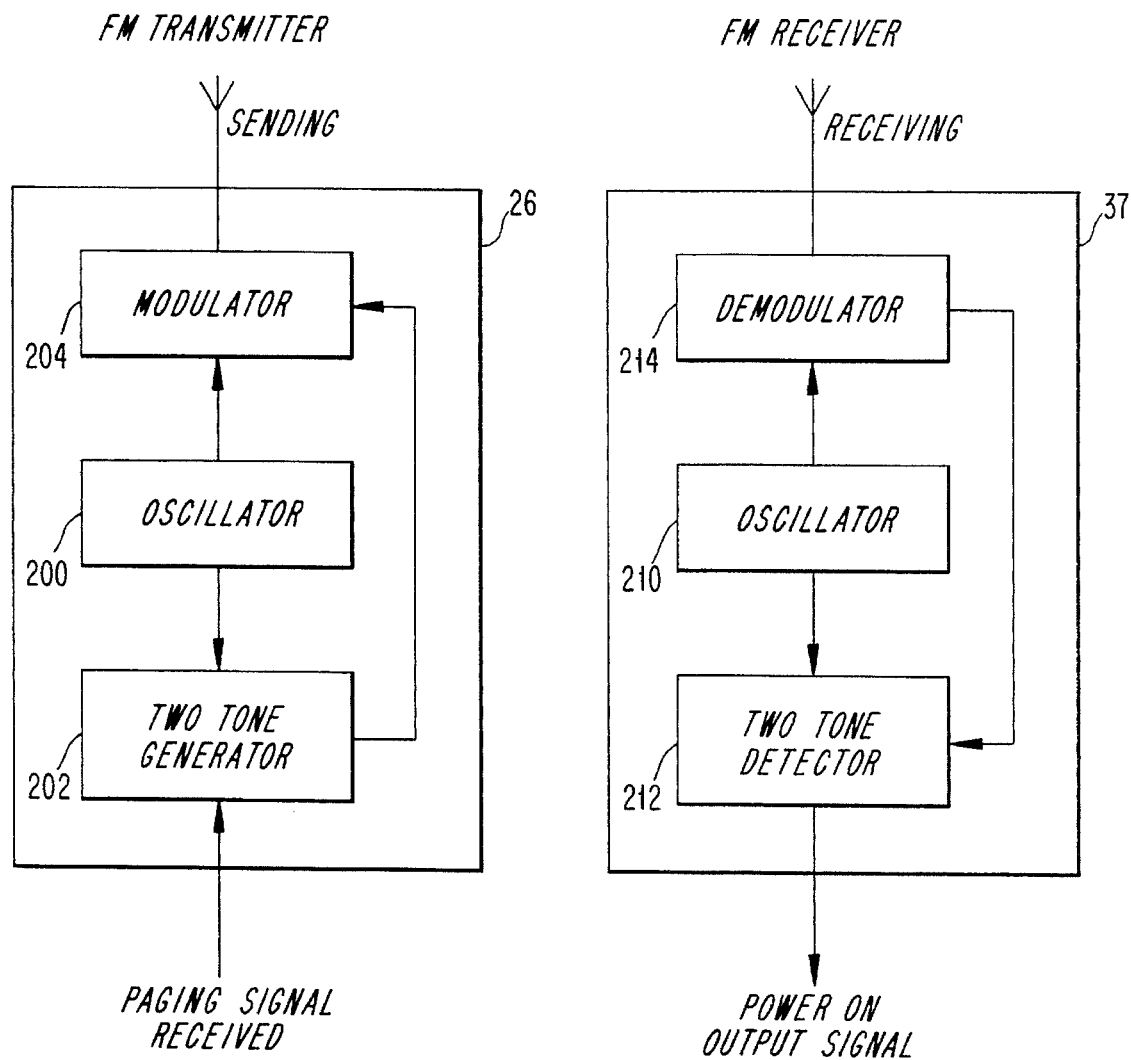
FIG. 2 illustrates a more detailed functional block diagram of a low power, radio transmission system to implement communications between pager and mobile according to the present invention.

The additional FM radio communications circuitry for signalling between the pager 21 and the mobile telephone 30 is well known and may include, for example, the conventional FM transmitter 26 and the FM receiver 37 pair illustrated in more detail in FIG. 2. The FM transmitter 26 includes an oscillator 200 connected to a modulator 204 and a two tone generator 202. Similarly, the FM receiver 37 includes an oscillator 210 connected to a demodulator 214 and a two tone detector 212. Essentially, the oscillators 200 and 210 generate a frequency corresponding to the FM carrier frequency. In the FM transmitter 26, the carrier and two tone information signal are mixed and transmitted via an antenna. The FM receiver 37 receives the FM signal and demodulates the carrier from the tone signal in the demodulator 214. The two tone signal is detected by the detector 212 which generates a power-on signal for activating the mobile telephone 30.

An alternative embodiment to FM signalling is the transmission of one or more acoustical tones from the pager of one or more acoustical tones from the pager 21 to the mobile station 30 when the pager 21 receives a page. The mobile 30 may include a conventional "key-finder" receiver where an audible tone or pair of tones from the pager 21 causes the key-finder to generate an answer signal. In this case, the answer signal would be a power on signal.

A predetermined time after the call has been forwarded to the pager 21, the MSC 42 is programmed to redirect the call back to the mobile telephone 30. Thus, the call to the mobile telephone 30 is forwarded initially to the pager 21 because of the call forwarding feature activated in the sleep mode. After a predetermined time, the MSC 42 terminates the call to the paging system and reroutes the call back to the mobile telephone 30 via the base station 40. By the time the call is rerouted, the pager 21 has turned the power of the mobile telephone 30 "on" so that it is prepared to receive the call directly.

By taking advantage of call forward capabilities available over the existing telephone network, the present invention activates a sleeping mobile telephone only when a call is being placed to that mobile telephone. In this way, power is drawn from the battery 36 only when an actual call is being directed to the mobile telephone 30, when the subscriber initiates a call, and when there is an on-going call. Moreover, the subscriber does not have to be concerned with monitoring a pager or with returning a phone call after receiving a page.

A subscriber may select the page mode if he does not want to be interrupted but would, nonetheless, like to be informed of incoming calls and return them at a later time. As in the sleep mode, the mobile telephone 30 is deactivated and the pager 21 is activated. The caller dials the page phone number, the call is forwarded to the paging system 50 and paging is performed. The pager 21 does not activate the mobile telephone 30 upon receiving a page. After a predetermined time, the call is redirected to the mobile station 30 by the MSC 42, but the mobile station does not answer because it is deactivated. As a result, the MSC 42 registers the page, i.e., the A-number of the calling subscriber for later retrieval. Thus, the pager simply performs as a conventional pager as described in the background of the invention. The control unit 23 alerts the subscriber of a call audibly by activating the beeper 24 and visibly by displaying the telephone number of the caller on the display 25.

In the fourth mode, the mobile telephone 30 is "off". In this mode both the mobile telephone 30 and the pager 21 are turned off in order to minimize costs and eliminate any interruption to the subscriber from incoming calls. Of course, if there are incoming calls, the mobile switching center 42 may store any messages and/or numbers so that the subscriber may deal with these calls at a later time.

It should be recognized that when a mobile station is in the ON mode, that mobile station continually registers with the MSC 42 to provide the MSC 42 with its current location. This registration also takes place when the mobile is activated by a signal from the pager 21 in the sleep mode. However, when the mobile station is switched from the on mode to any of the other modes (sleep, page or off), it first signals to the MSC 42 that it is no longer "on". Based on that deactivation signal, the MSC 42 forwards calls directed to the deactivated mobile to the paging network 50 for further processing depending on the actual mode.

Figure 3:
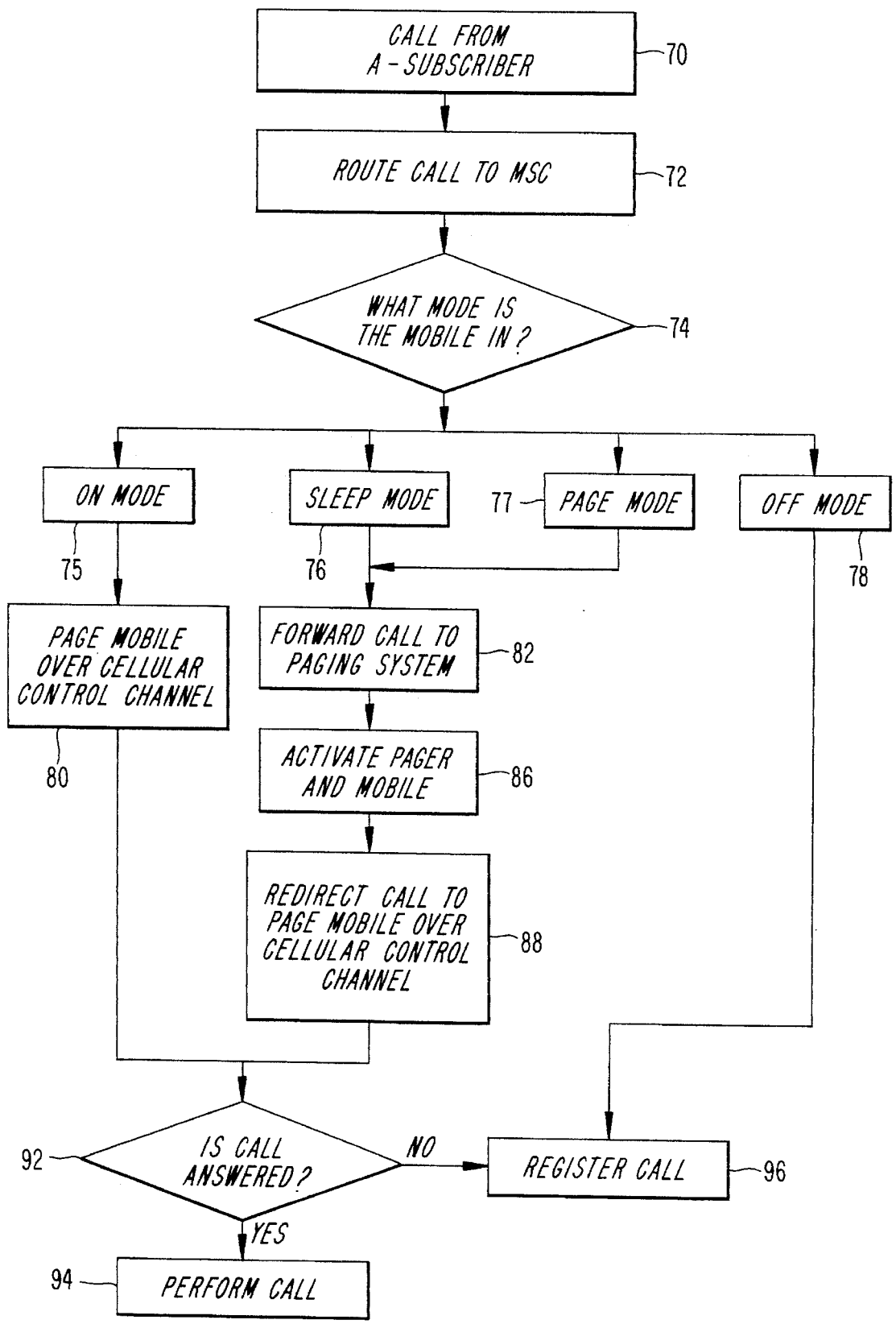
FIG. 3 shows a flow chart of the paging process according to the present invention.

FIG. 3 illustrates the program flow followed in routing an incoming call from a subscriber A, assumed only for purposes of description to be connected to the public switching telephone network, to a cellular subscriber B. Obviously, the incoming call could be initiated from another mobile telephone.

In step 70, subscriber A initiates a call to subscriber B from the public switching network (PSTN). The public switching telephone network 44 routes that incoming call to the mobile switching center (MSC) 42 in step 72. In step 74, the mobile switching center 42 determines the current mode of the mobile telephone 30 of the subscriber B. If the "on" mode has been selected in block 75, the mobile switching center 42 transmits a page to the mobile telephone 30 over the cellular control channel of its associated base station in step 80. In step 92, the mobile switching center 42 determines whether or not the call has been answered by the subscriber B. If the call has been answered, voice communications between subscriber A and subscriber B commence as indicated in step 94. Otherwise, the fact of the call as well as a message (e.g., the caller's telephone number) may be stored in the memory of the mobile switching center 42 in step 96 for later recall by the subscriber B.

If the mobile telephone 30 has been switched to a sleep mode in block 76, the mobile switching center 42 forwards calls to the paging system 50 in step 82. The paging system 50 signals the pager 21 to activate the mobile telephone 30 in step 86. In step 88, the mobile switching center 42 redirects the incoming call back to page the mobile telephone 30 over the cellular control channel after a predetermined time. In step 92, it is determined whether or not the call has been answered by the subscriber B. If the call is answered, then the communication between subscriber A and subscriber B is carried out in step 94. Otherwise, a message is stored in the mobile switching center 42 in step 96 for later recall by the subscriber B.

When the mobile telephone 30 has been switched to the page mode in block 77, the mobile switching center 42 sends a page message to the pager 21 in step 82. In step 86, even though the pager 21 is activated, any attempts to activate the switched off mobile station 30 are without effect. The subscriber B is alerted of the page in step 88, and the telephone number of the subscriber A may be displayed in display 25 and stored in the mobile switching center 42 for subsequent retrieval by the subscriber B in step 96 because the call is not answered.

In the "off" mode in block 78, any calls to the subscriber B are stored at the mobile switching center 42 for subsequent retrieval. Steps 82, 86, and 88 have no effect.

Figure 4:
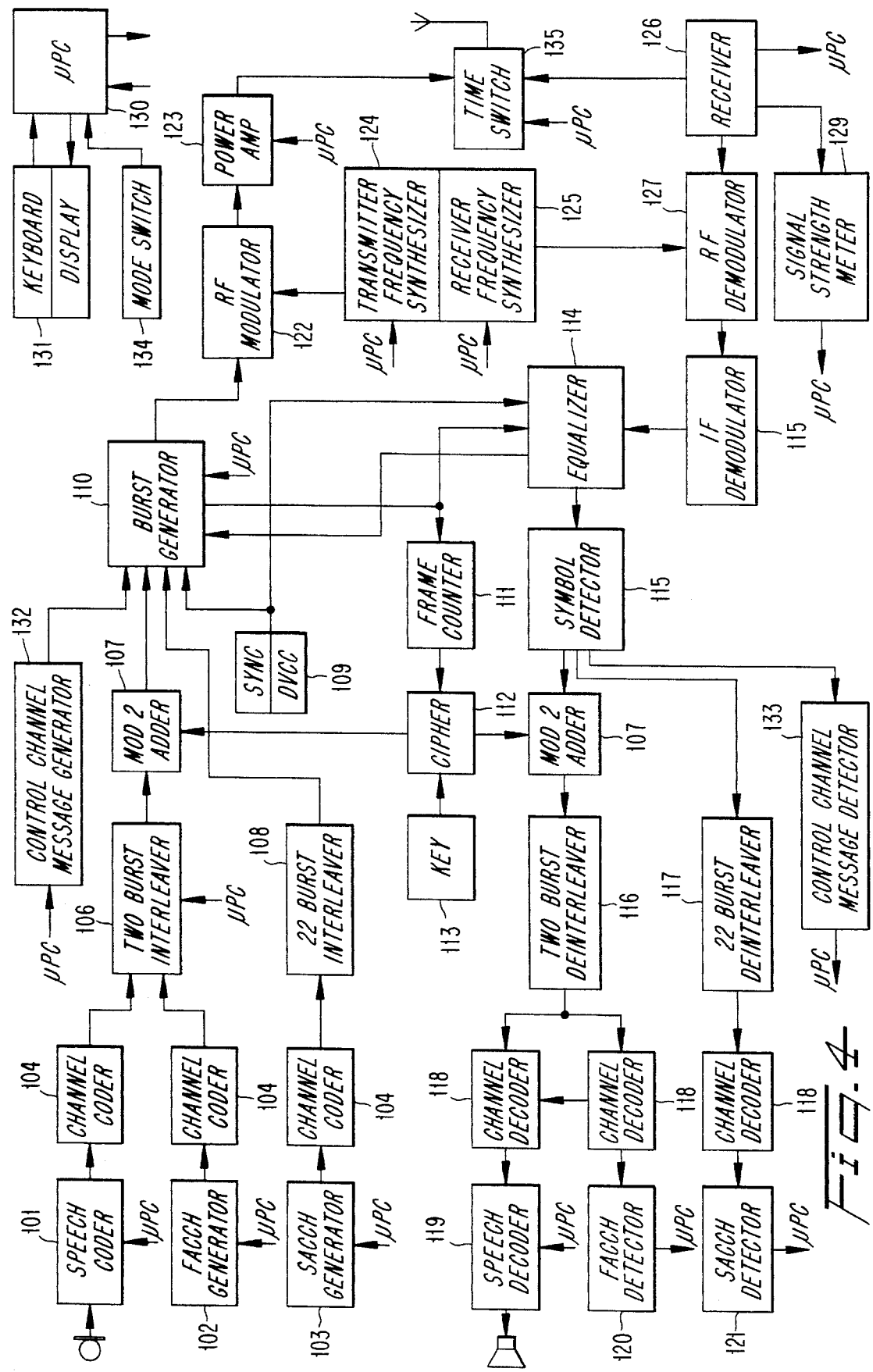
FIG. 4 shows a functional block diagram of the communications unit and mode switch in the mobile telephone according to the present invention.

Referring now to FIG. 4, an embodiment of a mobile station that can be utilized in a cellular telephone system that operates in accordance with the present invention is illustrated. This particular example pertains to a mobile station that can be used in a purely digital Time Division Multiple Access (TDMA) communications system, i.e. one in which digitized voice information is transmitted between base and mobile stations and in which the control channels are digital TDMA channels. Furthermore, the operation of the system is explained in the context of full-rate transmissions, in which each packet of digital information is interleaved over two spaced time slots in a frame of data. It will be readily appreciated, however, that the invention is equally applicable to other types of cellular radio systems, such as those in which information is transmitted in an analog format or transmitted digitally at a half rate.

In the mobile station depicted in FIG. 4, a speech coder 101 converts the analog voice signal generated by a microphone into a binary data stream. The data stream is divided into data packets, according to the TDMA principle. A fast associated control channel (FACCH) generator 102 generates control and supervision signalling messages that are transmitted from the mobile station to the land-based system. The FACCH message replaces a user frame (speech/data) whenever it is to be transmitted. A slow associated control channel (SACCH) generator 103 provides signalling messages that are transmitted over a continuous channel for the exchange of information between the base station and the mobile station and vice-versa. A fixed number of bits, e.g. twelve, is allocated to the SACCH for each time slot of a message train. Channel coders 104 are respectively connected to the speech coder 101, FACCH generator 102, and SACCH generator 103 for manipulating the incoming data in order to carry out error detection and correction. The techniques used by the channel coders 104 are preferably convolutional encoding, which protects important data bits in the speech code, and cyclic redundancy check (CRC), wherein the perceptually significant bits in the speech coder frame, e.g. twelve bits, are used for computing a seven-bit check.

A two burst interleaver 106 is connected to the channel coders 104 associated with the speech coder 101 and the FACCH generator 102, respectively. The interleaver 106 is controlled by a microprocessor controller 130 so that, at appropriate times, user information over a particular speech channel is replaced with system supervision messages over the FACCH. Data to be transmitted by the mobile station is interleaved over two distinct time slots. A packet of 260 data bits, which constitute one transmitting word, are divided into two equal parts and are interleaved over two different time slots. The effects of RAYLEIGH fading will be reduced in this manner. The output of the two-burst interleaver 106 is provided to the input of a modulo-two adder 107 so that the transmitted data is ciphered bit-by-bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over the SACCH over 22 time slots each consisting of 12 bits of information.

The mobile station further includes a Sync Word/DVCC generator 109 for providing the appropriate synchronization word (Sync Word) and DVCC (digital verification color code) which are to be associated with a particular connection. The Sync Word is a 28 bit word used for time slot synchronization and identification. The DVCC is an 8-bit code sent by the base station to the mobile station, and vice-versa, for assuring that the proper channel is decoded.

A burst generator 110 generates message bursts for transmission by the mobile station. The burst generator 110 is connected to the outputs of the modulo-two-adder 107, the 22-burst interleaver 108, the Sync Word/DVCC generator 109, an equalizer 114, and a control channel message generator 132, to integrate the various pieces of information from these respective units into a single message burst. For example, according to the published U.S. standard EIA/TIA IS-54, a message burst comprises data (260 bits), SACCH (12 bits), Sync Word (28 bits), coded DVCC (12 bits), and 12 delimiter bits, combined for a total of 324 bits. Under the control of the microprocessor 130, two different types of message bursts are generated by the burst generator 110: control channel message bursts from the control channel message generator 132 and voice/traffic message bursts. The control channel message uses a TDMA time slot reserved to a control channel, where it replaces the SACCH as well as the speech data normally generated in a voice/traffic burst.

The transmission of a burst, which is equivalent to one time slot, is synchronized with the transmission of other time slots, which together make up a frame of information. For example, under the U.S. standard, a frame comprises three full-rate time slots. The transmission of each burst is adjusted according to timing control provided by the equalizer 114. Due to time dispersion, an adaptive equalization method is provided in order to improve signal quality. For further information regarding adaptive equalization techniques, reference is made to U.S. patent application Ser. No. 315,561, filed Feb. 27, 1989, and assigned to the same assignee. Briefly, the base station functions as the master and the mobile station is the slave with respect to frame timing. The equalizer 114 detects the timing of an incoming bit stream from the base station and synchronizes the burst generator 110. The equalizer 114 is also operable for checking the Sync Word and DVCC for identification purposes.

The burst generator 110 is coupled to the frame counter 111 and the equalizer 114. The frame counter 111 updates a ciphering code utilized by the mobile station for each transmitted frame, e.g. once every 20 ms. A ciphering unit 112 is provided for generating the ciphering code utilized by the mobile station. A pseudo random algorithm is preferably utilized. The ciphering unit 112 is controlled by a key 113 which is unique for each subscriber. The ciphering unit 112 consists of a sequencer which updates the ciphering code.

The burst produced by the burst generator 110, is forwarded to an RF modulator 122. The RF modulator 122 is operable for modulating a carrier frequency according to the π/4-DQPSK method (π/4 shifted, Differentially encoded Quadrature Phase Shift Keying). The use of this technique implies that the information is differentially encoded, i.e., 2-bit symbols are transmitted as four possible changes in phase; ±π/4 and ±3π/4. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123 and passes a time switch 135. The RF power emission level of the amplifier is selected on command by a microprocessor controller 130.

A receiver carrier frequency signal is generated in accordance with the selected receiving channel by a receiving frequency synthesizer 125. Incoming radio frequency signals are received by a receiver 126. The signal strengths over the cellular frequencies are measured by a signal level meter 129. Signal strength values are sent to the microprocessor controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency. The intermediate frequency signal is then demodulated by an IF demodulator 128, which restores the original π/4-DQPSK—modulated information.

The restored information provided by the IF demodulator 128 is supplied to the equalizer 114. A symbol detector 115 converts the received symbol format of the digital data from the equalizer 114 to a single-bit data stream. The symbol detector 115 in turn produces three distinct output signals. Control channel messages are sent to a control message detector 133 which supplies detected control channel information to the microprocessor controller 130. Any speech data/FACCH data is supplied to a modulo-two adder 107 and a two-burst deinterleaver 116. The speech data/FACCH data is reconstructed by these components by assembling and rearranging information from two time slots of the received data. The symbol detector 115 supplies SACCH data to a 22-burst deinterleaver 117. The 22-burst deinterleaver 117 reassembles and rearranges the SACCH data, which is spread over 22 consecutive frames.

The two-burst deinterleaver 116 provides the speech data/FACCH data to two channel decoders 118. The convolutionally encoded data is decoded using the reverse of the above-mentioned coding principle. The received cyclic redundancy check (CRC) bits are checked to determine if any error has occurred. The FACCH channel decoder furthermore detects the distinction between the speech channel and any FACCH information, and directs the decoders accordingly. A speech decoder 119 processes the received speech data from the channel decoder 118 in accordance with a speech decoder algorithm (e.g. VSELP), and generates the received speech signal. The analog signal is finally enhanced by a filtering technique. Messages on the fast associated control channel are detected by a FACCH detector 120, and the information is transferred to the microprocessor controller 130.

The output of the 22-burst deinterleaver 117 is provided to a separate channel decoder 118. Messages on the slow associated control channel are detected by a SACCH detector 121, and that information is transferred to the microprocessor controller 130.

The microprocessor controller 130 controls the mobile station activity and the base station communication, and also handles the terminal keyboard input and display output 131. Decisions by the microprocessor controller 130 are made in accordance with received messages and measurements that are made. The keyboard and display unit 131 enable information to be exchanged between the user and the base station. The mode selection switch 134 is used to select one of the four modes of operation of the mobile telephone.

The paging format followed by the pager 21 will now be described in conjunction with FIG. 5. For a more detailed paging operation description, please refer to "The Book of the CCIR Radiopaging Code No. 1," published by the Radio Standards Paging Group. A page transmission from the paging network 50 includes a preamble followed by batches of complete code words, each batch of code words starting with a synchronization word. The preamble assists the pager 21 in obtaining bit, word, and batch synchronization. The preamble is typically a pattern of bit reversals, e.g., 1010, repeated for a period of at least the number of bits making up the duration of a batch plus a code word. The preamble gives the pager 21 an opportunity to save battery power because the receiver 22 can be turned on for a few milliseconds and then turned off again for about one second if no preamble is detected.

Code words are structured in batches which include a synchronization code word followed by eight frames, each frame containing two code words. The frames are numbered 0–7, and the page population is divided into eight groups. The pager 21 is allocated to one of the eight frames according to the three least significant bits of its 21 bit identification code. For example, if the least three significant bits equal 000, that pager is allocated to the frame 0 and it only examines address code words in that frame. Therefore, each pager's address code words must be transmitted only in the allocated frame. This frame structure within a batch offers another means of battery saving within the pager because the receiver need only be turned on to monitor the synchronization code word and its particular frame. Accordingly, the energy requirements are reduced considerably when compared to that required for constant reception. Message code words for any receiver may be transmitted in any frame that directly follows the associated address code word. A message may consist of any number of code words transmitted consecutively and may span one or more batches.

Code words contain 32 bits which are transmitted with the most significant bits first. The structure of a code word is illustrated in FIG. 5. Bit 1 is flag bit of an address code word and is always a zero. This distinguishes it from a message code word. Bits 2–19 are address bits corresponding to the 18 most significant bits of a 21 bit identification number assigned to the pager. Bits 20 and 21 are two function bits which are used to select the required address from the four assigned to the pager. Hence the total number of addresses is $2^{23}$ (over eight million). Bits 22 to 31 are parity check bits, and the final bit 32 is chosen to give even parity.

When using the above-described paging system with a mobile in the sleep mode, the delay through the paging system may be longer than the time a calling subscriber may be expected to wait. This delay also affects telephone network operators that may not want to tie up resources waiting for the call to be connected during which they do not receiver compensation. Two alternatives are described below which provide solutions to these problems.

First, the paging system may monitor the total number of page requests. If this number exceeds a certain limit, one or several groups of mobiles may be ordered out of the sleep mode to monitor the cellular paging channels in the conventional manner. In this way, the number of page requests demanded of the paging system is reduced at the cost of increased battery drain on mobiles that have been activated for paging purposes. When the number of page requests has decreased below another predetermined limit, those mobile groups initially ordered to monitor the cellular paging channels are ordered back into the sleep mode so that paging via the conventional paging system is restored. Battery drain is distributed evenly between the mobile groups by alternating which group is ordered to monitor the cellular paging channels. For example, the order to monitor the cellular paging channel may be implemented as a group paging message to reach some fraction (e.g., one-eighth), of the paging population as specified by a group identification number in addition to the individual paging and identification number assigned to each pager. In paging systems following the (POCSAC) standard described above, this group identification number may be transmitted in the frame associated with the pagers in question. The order to return a group of mobiles to the sleep mode via the cellular system is accomplished by sending on the cellular paging channels a page to a virtual mobile with the appropriate group identification number.

The second alternative solution to call delay is to use a voice synthesis device to inform the calling subscriber to hang up and call again in a predetermined number of seconds (e.g., 50 seconds) needed to page the subscriber, when the number of page requests in the paging system is greater than a predetermined value. This solution avoids occupying the channel connection while a subscriber waits for the call request to be connected as well as avoids asking the called subscriber to ring back and pay for the call.

From the foregoing description of the specific embodiment, others can, by applying current knowledge, readily modify and/or adapt for various applications such specific embodiments without departing from the general nature of the invention, and, therefore, such adaptations and modifications should and are intended to be comprehended within the meaning and usage of equivalents of the disclosed embodiments. It is to be understood that the terminology employed herein is for the purpose of description and not of limitation.

What is claimed is:

1. A cellular communication system, where mobile telephones communicate with a network switching center via a corresponding base station, and used in conjunction with a paging system, comprising:

a plurality of mobile radio telephones, each mobile telephone operating in one of multiple modes; and a plurality of pagers, each pager transmitting and receiving only radio signals and being associated with but separate from one of said plurality of mobile telephones, wherein each of said pagers comprises:

a receiver for receiving page signals and an identification number specific for the pager;

control means connected to said receiver for generating an activation signal when said mobile telephone is in a first mode; and a transmitter connected to said control means for generating a radio signal having a frequency different from the radio frequencies sent between said base station and the mobile station, modulated by a low frequency signal which is specific for the pager, wherein the radio signal includes an address of the mobile telephone associated with the pager, wherein each of said mobile telephones has a receiver including demodulating means for demodulating, in correspondence with the modulation of said radio signal transmitted from the pager, said radio signal from said transmitter in the associated pager for generating an activating signal in order to provide power to the mobile telephone;

wherein said paging system comprises:

means for monitoring a total number of page requests;

means for comparing said total number of page requests with a predetermined limit; and means for ordering at least one mobile telephone to switch from said first mode to a second mode when said total number of page requests exceeds said predetermined limit.

2. The system according to claim 1, wherein said first mode is a sleep mode.

3. The system according to claim 1, wherein said ordered mobile telephone monitors cellular paging signals transmitted on a control channel associated with said corresponding base station.

* * * * *